United States Patent
Beliles, Jr. et al.

(10) Patent No.: US 7,881,209 B2
(45) Date of Patent: Feb. 1, 2011

(54) METHOD AND SYSTEM FOR PROTECTING COMMUNICATION NETWORKS FROM PHYSICALLY COMPROMISED COMMUNICATIONS

(75) Inventors: Robert Pryor Beliles, Jr., Pleasanton, CA (US); Peter Chow, San Jose, CA (US); Glenn Dasmalchi, Half Moon Bay, CA (US); Massimo Civilini, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 923 days.

(21) Appl. No.: 11/494,414

(22) Filed: Jul. 27, 2006

(65) Prior Publication Data
US 2008/0025229 A1 Jan. 31, 2008

(51) Int. Cl.
*H04L 1/00* (2006.01)
(52) U.S. Cl. .................................................. 370/242
(58) Field of Classification Search ................ 340/5.2; 714/48; 726/23; 370/241, 242, 245; 379/32.01, 379/32.02, 32.03, 32.04, 32.05, 33, 35; 455/405
See application file for complete search history.

(56) References Cited

U.S. PATENT DOCUMENTS 7,055,174 B1 * 5/2006 Cope et al. .................... 726/22
7,447,147 B2 * 11/2008 Nguyen et al. ............... 370/216
2005/0129033 A1 * 6/2005 Gordy et al. ................. 370/401
2007/0094728 A1 * 4/2007 Julisch et al. ................. 726/23
2009/0021343 A1 * 1/2009 Sinha .......................... 340/5.2

OTHER PUBLICATIONS

Sniffing (network wiretap, sniffer) FAQ, Robert Graham, http//www.robertgraham.com/pubs/sniffing-faq.html, Version 0.3.3, Sep. 14, 2000.
Telephone Testing Equipment, TSCM Technical Services, http://tscmtech.com/Telehpone%20Testing.htm Oct. 30, 2002.
Bug Detectors and Phone Protection Devices, Spy Chest, http://www,spytechs.com/bug_sweep_equip/default.htm.

* cited by examiner

Primary Examiner—Albert T Chou
(74) Attorney, Agent, or Firm—Cindy Kaplan

(57) ABSTRACT

A method and system for protecting a packet switched network from compromised communications due to a physical intrusion in the network are disclosed. The network includes at least one network element having a detection device operable to detect a possible physical intrusion in a data communication path connected to the network element. The method includes receiving a notification from the detection device that the detection device has identified a physical intrusion in the data communication path, generating an alert, and transmitting the alert over the packet switched network. The alert may include instructions on how to remediate the physical intrusion that can be automatically implemented by a given network-connected device or manually addressed by a network user or network administrator.

25 Claims, 4 Drawing Sheets

METHOD AND SYSTEM FOR PROTECTING COMMUNICATION NETWORKS FROM PHYSICALLY COMPROMISED COMMUNICATIONS

BACKGROUND OF THE INVENTION

Network intrusion and eavesdropping is a significant security concern to private, public, government, and military establishments. The ability to physically intrude or eavesdrop on various network based systems has long been a concern. As more users access the Internet and as companies expand their networks, the challenge to provide security for computer networks becomes increasingly difficult. A physical intrusion into a system may involve connecting into a communication path or link or inserting a tap into the link, for example.

In a packet/frame/cell (PFC) network, intrusions and eavesdropping can be performed on a physical or logical level. PFC network intrusion prevention has focused on prevention of logical network intrusion using techniques such as data encryption. Physical intrusion security measures on PFC networks are left to securing areas which provide access to network infrastructure devices. Conventional attempts to secure network systems from compromised communications have focused on prevention through limited physical access to the systems and interconnections using locked facilities and cabling conduits. However, networks such as wide area networks, which are used to extend the corporate Intranet to many remote areas, include cabling that typically passes through public zones. Physical access to a network link usually allows a person to tap that link or inject traffic into it.

Detection of compromised communications has been generally limited to discrete temporarily deployed devices that do not communicate directly with the network or system users. Conventional detection systems typically require manual intervention to close off or reroute traffic past the compromised link. Communications may therefore be compromised for an extended period of time before action is taken to avoid the intrusion. As such, the loss of confidential information may be significant since the users have no immediate notification that their communications have been compromised.

While detection schemes may be equally viable for circuit-switched and PFC based network systems, detection alert generation and intrusion remediation techniques that work in circuit-switched network systems generally do not work in a PFC based network. Conventional security methods for PFC based networks do not provide a comprehensive solution for rapid response to a physical intrusion.

There is, therefore, a need for a system and method which alerts users or devices of a PFC network of a possible physical intrusion so that measures can be taken to prevent or minimize loss of secure data or damage to the network due to unauthorized access.

SUMMARY OF THE INVENTION

A method and system for protecting a packet switched (PFC-based) network from compromised communications due to a physical intrusion in the network are disclosed. The network includes at least one network element having a detection device operable to detect a possible physical intrusion in a data communication path connected to the network element. The method generally comprises receiving a notification from the detection device that the detection device has identified a physical intrusion in the data communication path, generating an alert, and transmitting the alert over the packet switched network.

A system for protecting a packet switched (PFC-based) network from compromised communications due to a physical intrusion in the network generally comprises an alert generator operable to receive a notification from the detection device that the detection device has identified a physical intrusion in the data communication path and generate and transmit an alert to one or more network users or network elements.

BRIEF DESCRIPTION OF THE DRAWINGS

Corresponding reference characters indicate corresponding parts throughout the several views of the drawings.

DESCRIPTION OF SPECIFIC EMBODIMENTS

The following description is presented to enable one of ordinary skill in the art to make and use the invention. Descriptions of specific embodiments and applications are provided only as examples and various modifications will be readily apparent to those skilled in the art. The general principles described herein may be applied to other embodiments and applications without departing from the scope of the invention. Thus, the present invention is not to be limited to the embodiments shown, but is to be accorded the widest scope consistent with the principles and features described herein. For purpose of clarity, details relating to technical material that is known in the technical fields related to the invention have not been described in detail.

A method and system described herein respond to unauthorized physical disruptions or intrusions in a data network link of a packet switched network. As used herein, "packet switched network" refers to all packet, frame, and cell (PFC) networks. In one embodiment, a policy based system provides quick and dynamic alerts to affected users, network managers, and other network infrastructure devices of a compromised data communication path (link). The method and system may also provide for an automatic physical or logical modification to the network system to prevent further compromise of the communication path.

Figure 1:
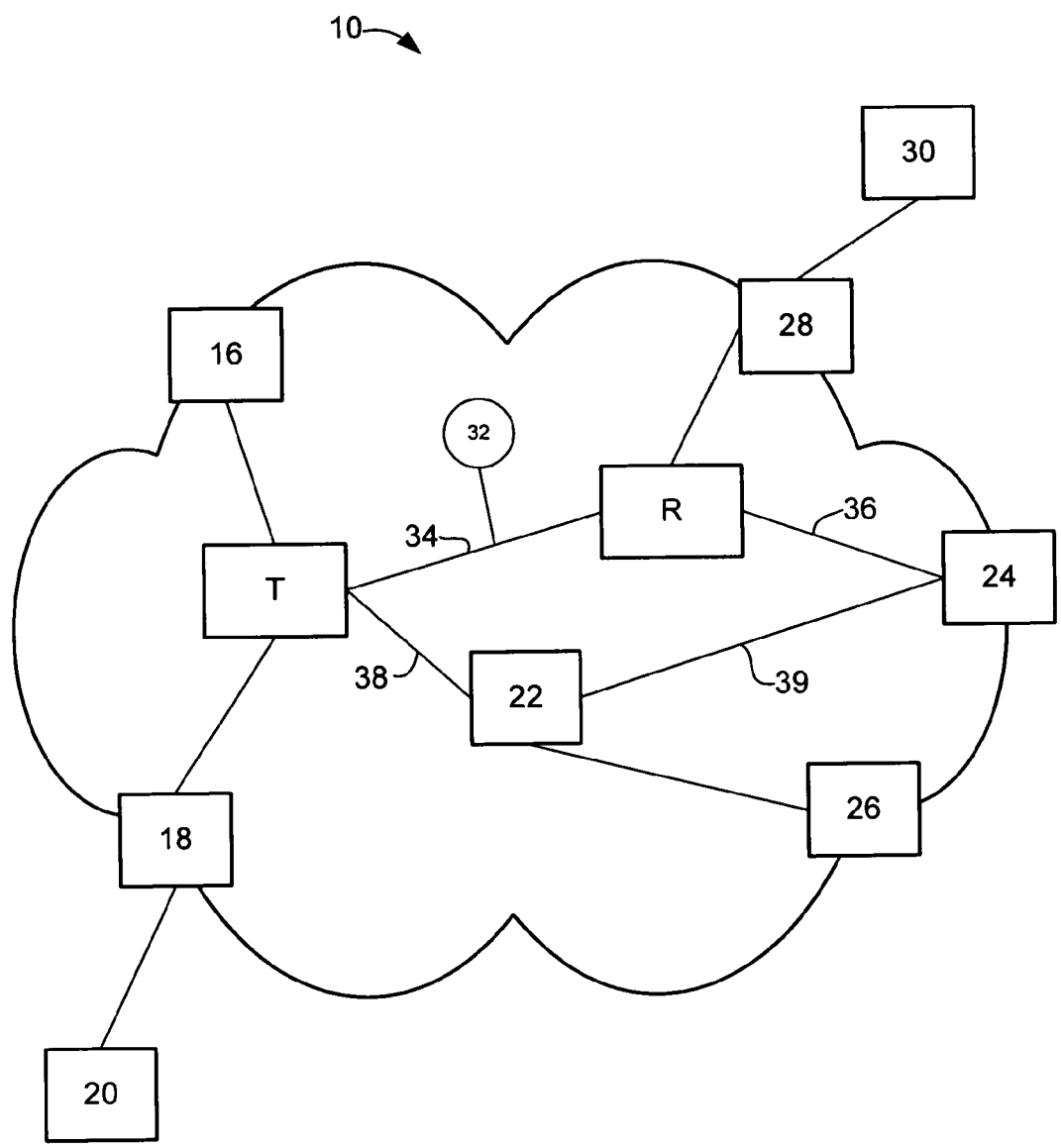
FIG. 1 illustrates an exemplary network that may use techniques of embodiments described herein.

The method and system operate in the context of a data communication network including multiple network elements. FIG. 1 is a diagrammatic representation showing a network that may use techniques of the method and system described herein. The data communication network comprises multiple network elements (nodes) T, R, 16, 18, 20, 22, 24, 26, 28, 30. The nodes may include, for example, routers, switches, hosts, servers, user devices, IP phones, or other IP-based devices that use Ethernet or other packet/frame technologies such as DSL, cable modem, T1/E1, or optical transmission, for example. A transmitter T and receiver R are shown connected by a data communication path (link) 34 in FIG. 1. A physical intrusion is illustrated as a tap 32 in the data communication path 34 between the transmitter T and receiver R. The tap 32 may be configured for collecting data transmitted over the link 34 (e.g., eavesdropping) or the tap may be in communication with a network device (not shown) configured to attempt to spoof the transmitter, collect authentication information or encryption keys, or inject data into the network (e.g., attack), for example.

The system may be located in one or more network elements. For example, the system may be incorporated in only one node (e.g., T or R) on a communication path or all nodes on the path. It is to be understood that the nodes labeled T and R in FIG. 1 are only an example, and that any nodes in the network may incorporate the system described herein, including edge nodes. The system may be located in various network attached devices within a LAN (Local Area Network) or WAN (Wide Area Network), for centralized, local, or remote protection. The system may be incorporated in a network interface card (NIC), linecard, or included within software or hardware of the network device. Physical layer circuitry of the network device is preferably equipped with applicable detection circuitry to enable detection of a physical intrusion. As described below, the system is configured to provide remote devices located on different link segments with information and ability to take action to prevent compromised communications. It is to be understood that the system shown in FIG. 1 and described above is only one example and that the method and system described herein may be used in communication networks and network devices having various configurations.

Figure 2:
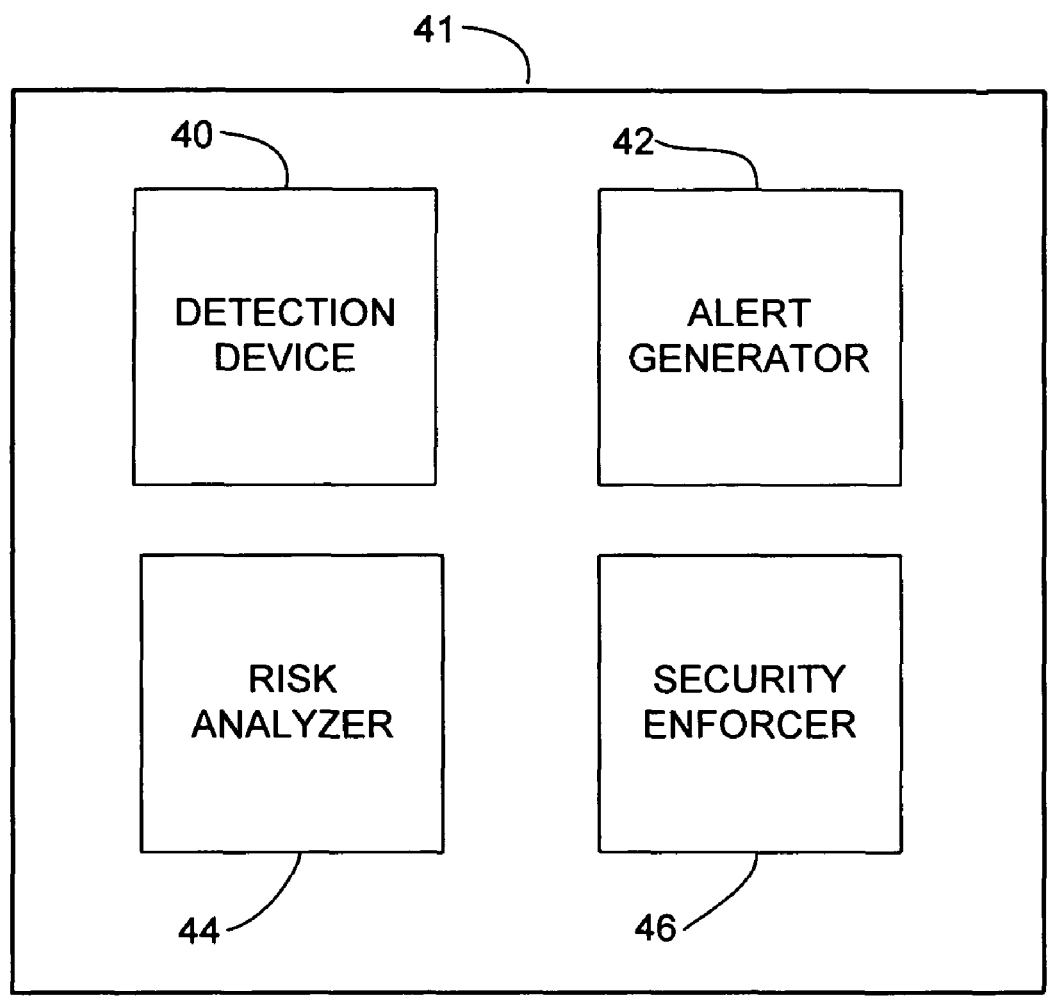
FIG. 2 is a block diagram illustrating components of one embodiment.

Referring now to FIG. 2, components of one embodiment of a system 41 are shown. The system includes a detection device 40, alert generator 42, risk analyzer 44, and security enforcer 46. It is to be understood that different embodiments may include only a portion of these components. For example, a system may include only a detection device 40 and alert generator 42. Also, one or more of the components may be incorporated into different areas of the network device, coupled to the network device, or operate independently from the other components. One device may also perform the function of two or more components.

The detection device 40 may include various types of test equipment for detecting physical intrusions or disturbance of a copper or optical fiber-based communication system, for example. In the case of a copper communication system, impedance, voltage drop, or current drop may be measured and compared to a previously established value. If the new measurement is significantly different from the predetermined (baseline) value, it may indicate that the link has been tampered with. For optical link intrusions, the brightness or wavelength of received light can be compared with a predetermined value to indicate possible tampering.

In one embodiment, TDR (Time Domain Reflectometry) is used to detect changes in a link. TDR is the analysis of a conductor (e.g., wire, cable, or fiber optic) by sending a pulsed signal into the conductor and then examining the reflection of that pulse. A pulse generator injects a fast-rising pulse into the cable. The pulse travels the length of the cable, bounces off the far end, and returns through the cable. A new device or wire attached to the conductor will cause an anomaly. By examining the polarity, amplitude, frequencies, and other electrical signatures of all reflections, tampering or bugs can be identified. In one embodiment utilizing TDR, the detection device includes a signal generator and monitor (e.g., decoder). The signal generator is used to generate a TDR signal. The monitor is used to monitor the voltage on the link as a function of time after generation of the signal to measure the response of the link to the TDR signal. The TDR check may be performed randomly or at periodic intervals (e.g., one minute, five minutes, etc.). The TDR check may also be performed at selected times (e.g., quiet interval when no data is being transmitted on the link). Random checks are preferred to avoid having the intruding device spoof the check. The TDR check may be performed at one device, or each device connected to the link may take turns performing the intrusion check. If the link is shut down for any reason, TDR measurements may be performed to make sure that no physical parameters were changed before a link is allowed to operate again.

It is to be understood that TDR is provided only as an example and that other methods may be used alone or in combination with TDR to provide an indication that there has been tampering with a link, or to rule out other changes in the communication path as signs of an intrusion. For example, the detection device 40 may identify if the link goes down, sudden errors appear on either end of the link, a sudden drop occurs in the data signal's amplitude, a mismatch between DC current supplied and received, or a sudden drop in DC current in the inline power while the link stays up. If any of these problems are detected, one or more checks may be performed to insure that no known and authorized physical changes took place which caused the change. Also, other methods such as high frequency cross talk evaluation may be used to detect changes in the communication link.

The detection device 40 generates a signal that can be acted upon by the system's alert generator 42, which is configured to send information to selected users or devices. The alert generator 42 may be any device which provides the automated transmission of notification information from a network device to one or more end users, network managers, or devices in communication with the compromised link. A versatile range of message formats are available for optimal compatibility with pager services, standard e-mail, or XML-based automated parsing applications. Notification may include, for example, direct paging of a network engineer or administrator, e-mail notification to operations staff or users, or direct contact with a technical assistance center. The alert message may also be a pre-recorded audio or video message. The message may be for information only, or can direct further actions to remediate the intrusion. For example, the notification may inform the recipient that a specified link may have been compromised and suggest options for secure transmission of data, if the link is to remain operational. The system may be configured to allow only certain entities to receive selected alerts based on a priority of the alert. The notification may also be a signal which is sent to a network device that can initiate action to be taken to secure the network, as described below. The, type, format, action, and recipients of the alert may be configured by a network administrator or manager, for example.

The security enforcer 46 operates to initiate action upon receiving an alert indicating that a link has been compromised. The action may include rerouting traffic, encrypting data, shutting down a port until the integrity of the link can be evaluated, sending only public information, or other appropriate action to maintain system security. For example, if tap 32 on link 34 of FIG. 1 is detected by the detection device 40, the security enforcer 46 may reroute traffic transmitted from transmitter T to destination 24 via links 34 and 36 to links 38 and 39. Upon detection of an intrusion, the system may also signal other devices to place the link in a high impedance state for a period of time to allow the system to send an extremely high voltage, current, light output, etc. signal down the affected link to effectively destroy the intrusion device. The system may use an encryption algorithm to send instructions to authorized network devices on the link. In order to avoid interception of the encryption keys, the users can be authenticated and public keys exchanged during user login. Encryption would then be enabled if an intrusion is detected.

The risk analyzer 44 is an optional intrusion likelihood quantifier which incorporates a granular assessment of the intrusion event. The analyzer 44 may assess how large of a change in voltage, current, or impedance the link experienced, the duration of time that the link experienced a change in voltage, current or impedance, or how long the link was in a down state (disconnected). The change may indicate a possible intrusion or indicate something that is more likely to point to a compromised system (depending on sensitivity level). The analyzer 44 may use parameters to understand if the cable has been unplugged. The risk analyzer 44 can thus incorporate granular information to validate the likelihood of an intrusion versus an inconsequential change. The risk analyzer 44 may also be used to assign a priority level to the notification sent out by the alert generator 42. Depending on the priority level, the alert may only be sent to a select group of recipients or different action may be initiated based on the priority level.

The detection device 40, alert generator 42, risk analyzer 44, and security enforcer 46, may be programmed or configured based on policies selected by a network manager, for example.

Figure 3:
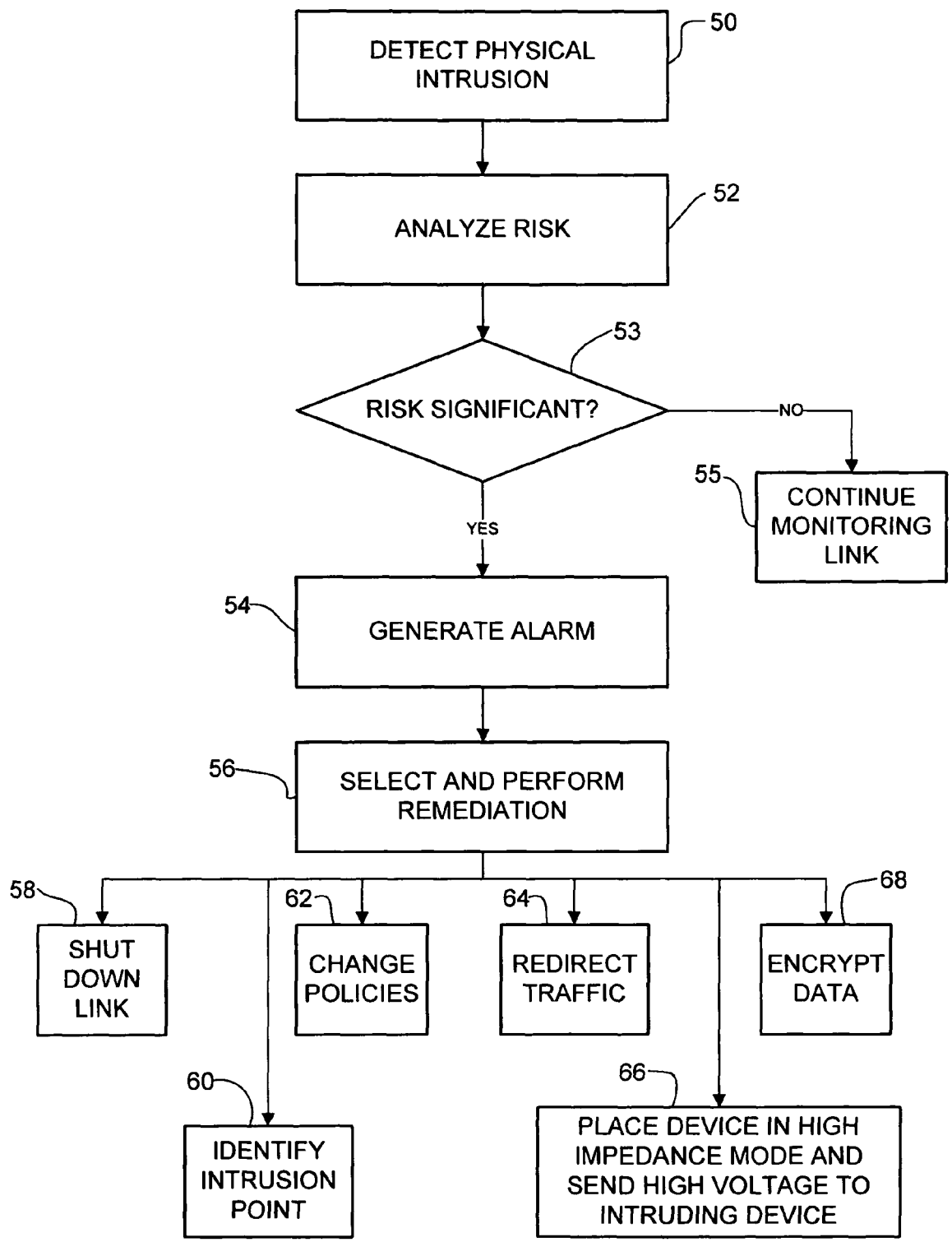
FIG. 3 is a flowchart illustrating a process of one embodiment for providing notification and action upon identification of a physical network intrusion.

FIG. 3 is a flowchart illustrating a process for generating an alert and notification of a compromised communication link, according to one embodiment. A physical intrusion of a communication link is detected at step 50. At step 52 the detected intrusion may be analyzed to determine the likelihood that the disruption detected was an unauthorized break into the link. As noted above, this step is optional. If it is determined that the risk of a compromised link is not significant, or the disruption was caused by a known source, no action is taken and monitoring of the link continues (steps 53 and 55). If the intrusion detected is quantified and the risk determined to be significant, an alarm is generated at step 54. Action is taken as previously specified by the network administrator, or other user (step 56). Remediation measures may include, but are not limited to: shut down link (step 58); identify intrusion point (step 60); change policies (step 62); redirect traffic (step 64); place device in high impedance mode and send high voltage to intruding device (step 66); and encrypt data transmitted over link (step 68). One or more of these steps may be taken, or it may be decided to take no action and wait for further evidence of intrusion. Also, a user may be asked to select an action to be taken upon notification of an intrusion.

It is to be understood that the process illustrated in FIG. 3 is only one example, and one or more of the steps may be eliminated, the order changed, or additional steps included.

Figure 4:
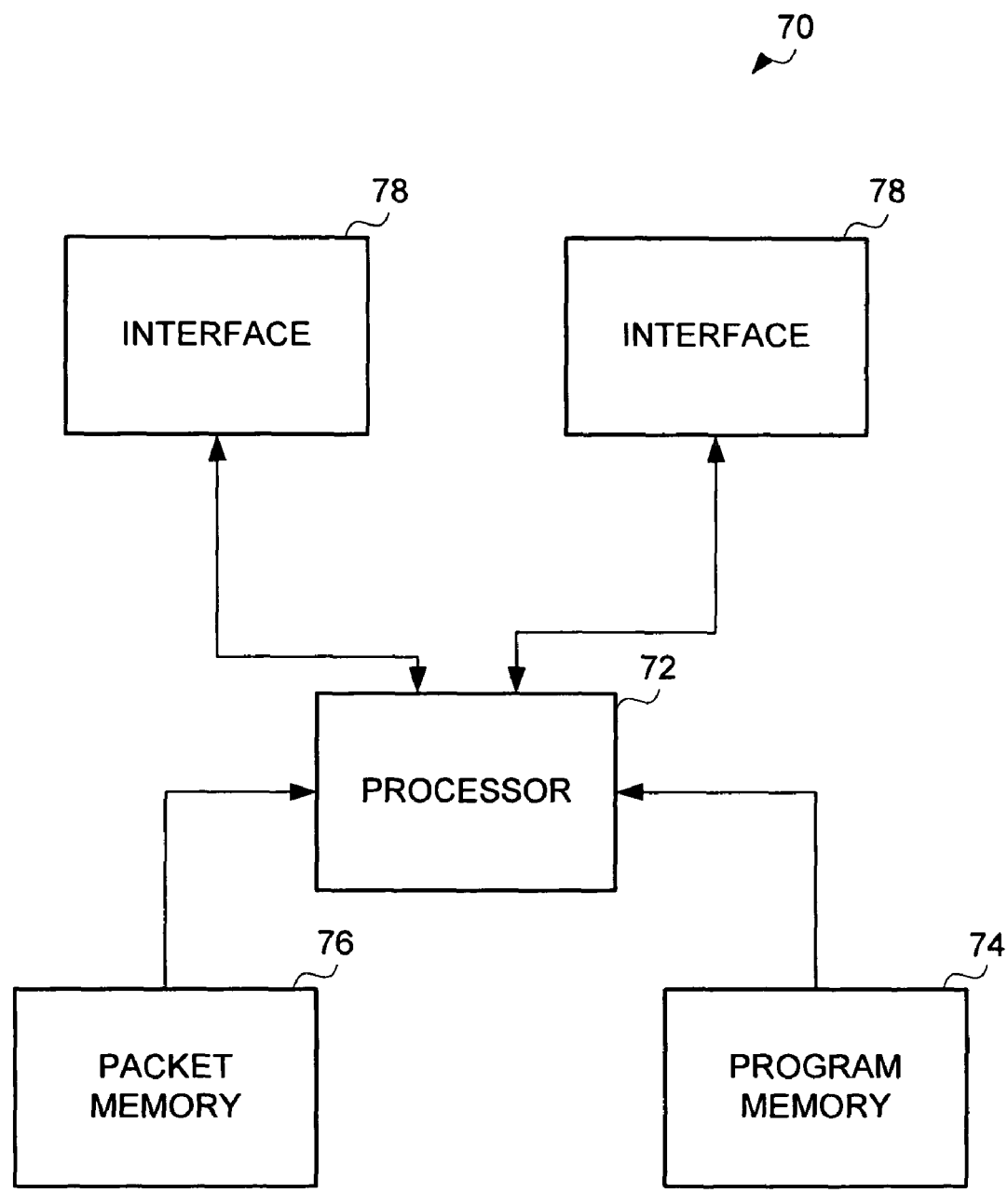
FIG. 4 illustrates a network device that may be used to implement the embodiments.

FIG. 4 depicts a network device 70 that may be used to implement the method and system described above. In one embodiment, network device 70 is a programmable machine that may be implemented in hardware, software, or any combination thereof. A processor 72 executes code stored in a program memory 74. The code may control the operation of an operating system or one or more applications, for example. Program memory 74 is one example of a computer-readable medium. Program memory 74 can be a volatile memory. Another form of computer-readable medium storing the codes may be some type of non-volatile storage such as floppy disks, CD-ROMs, DVD-ROMs, hard disks, flash memory, etc. A carrier wave that carries the code across a network is another example of a computer-readable medium.

Network device 70 interfaces with physical media via a plurality of network interfaces 78. The interfaces 78 may be a network port (or set of network ports), for example. As packets are processed and forwarded by network device 70, they may be stored in a packet memory 76. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces, and the like.

Network device 70 shown in FIG. 4 is only one example of a network device suitable for use with the embodiments. Other devices and systems having different configurations of subsystems may also be utilized.

As can be observed from the foregoing, the system and method described herein have many advantages. The system and method address the problem of physical link intrusion and passive eavesdropping on a packet/frame/cell network. Network managers, end users, and other devices, that do not directly adjoin the compromised network link segment can be alerted. The method and system may also be used to remediate the compromised link or send messages to other devices to take action in concert with the method and system. The possibility of compromised communications is decreased and the window of how long communications are compromised can be decreased.

Although the present invention has been described in accordance with the embodiments shown, one of ordinary skill in the art will readily recognize that there could be variations made to the embodiments without departing from the scope of the present invention. Accordingly, it is intended that all matter contained in the above description and shown in the accompanying drawings shall be interpreted as illustrative and not in a limiting sense.

What is claimed is:

1. A method comprising:
   protecting a packet switched network from compromised communications due to a physical intrusion in said packet switched network, said packet switched network including at least one network element comprising a detection device operable to detect a physical intrusion in a data communication path connected to said network element, wherein protecting comprises:
   receiving a notification from the detection device that the detection device has identified a physical intrusion in said data communication path;
   generating an alert; and
   transmitting said alert over said packet switched network;
   wherein the detection device is configured to measure a physical value and compare said physical value to a predetermined value.

2. The method of claim 1 further comprising performing an action to secure said packet switched network upon receiving said notification from the detection device, to prevent loss of data from said network or damage to said network.

3. The method of claim 2 wherein performing said action comprises shutting down a port of said network element connected to said data communication path.

4. The method of claim 2 wherein performing said action comprises changing a policy at said network element connected to said data communication path.

5. The method of claim 2 wherein performing said action comprises redirecting traffic from said data communication path.

6. The method of claim 2 wherein performing said action comprises encrypting data transmitted over said data communication path.

7. The method of claim 1 further comprising identifying an intrusion point along said data communication path.

8. The method of claim 1 wherein transmitting said alert comprises transmitting an e-mail to one or more users.

9. The method of claim 1 wherein transmitting said alert comprises sending an audio or video message to one or more network users.

10. The method of claim 1 further comprising identifying the risk of the physical intrusion detected by the detection device.

11. The method of claim 10 further comprising generating and transmitting said alert only if said risk is above a predetermined risk level.

12. The method of claim 1 wherein the physical intrusion is in a copper based communication system and said physical value comprises an impedance, voltage drop, or current drop.

13. The method of claim 1 wherein the physical intrusion is in an optical communication system and said physical value comprises a measurement of received light.

14. The method of claim 1 wherein the detection device utilizes time domain reflectometry to measure said physical value and compare said physical value to a predetermined value.

15. A method comprising:
protecting a packet switched network from compromised communications due to a physical intrusion in said packet switched network, said packet switched network including at least one network element comprising a detection device operable to detect a physical intrusion in a data communication path connected to said network element, wherein protecting comprises:
receiving a notification from the detection device that the detection device has identified a physical intrusion in said data communication path;
sending instructions to another network element coupled to said data communication path to operate in a high impedance mode; and
sending a high voltage signal over said data communication path.

16. A system for protecting a packet switched network from compromised communications due to a physical intrusion in said packet switched network, the system comprising:
a detection device configured to measure a physical value and compare said physical value to a predetermined value and detect a physical intrusion in a data communication path in said packet switched network; and
an alert generator operable to receive a notification from the detection device that the detection device has identified a physical intrusion in said data communication path and generate and transmit an alert over said packet switched network.

17. The system of claim 16 further comprising a security enforcer operable to secure said packet switched network upon receiving said notification from the detection device.

18. The system of claim 17 wherein said security enforcer is configured to reroute traffic.

19. The system of claim 17 wherein said security enforcer is configured to change a policy at said network element connected to said data communication path.

20. The system of claim 17 wherein said security enforcer is configured to redirect traffic from said data communication path.

21. The system of claim 17 wherein said security enforcer is configured to initiate data encryption for data transmitted over said data communication path.

22. The system of claim 16 wherein a security enforcer is configured to transmit instructions to another network element coupled to said data communication path to operate in a high impedance mode and transmit a high voltage signal over said data communication path upon receiving said notification from the detection device.

23. The system of claim 16 further comprising a risk analyzer configured for identifying the risk of the physical intrusion detected by the detection device.

24. A computer readable non-transitory storage medium encoded with a computer program comprising:
code for protecting a packet switched network from compromised communications due to a physical intrusion in said packet switched network, said packet switched network including at least one network element comprising a detection device operable to detect a physical intrusion in a data communication path connected to said network element, the code for protecting comprising:
code that receives a notification from the detection device that the detection device has identified a physical intrusion in said data communication path;
code that generates an alert;
code that transmits said alert over said packet switched network;
code that sends instructions to another network element coupled to said data communication path to operate in a high impedance mode; and
code that causes a high voltage signal to be sent over said data communication path.

25. The computer readable non-transitory storage medium of claim 24 further comprising code that analyzes a risk associated with the physical intrusion detected by the detection device.

* * * * *